Patented Feb. 1, 1938

2,106,760

UNITED STATES PATENT OFFICE 2,106,760

β-METHYL BUTYL CRESOLS

George W. Raiziss and Le Roy W. Clemence, Philadelphia, Pa., assignors to Abbott Laboratories, North Chicago, Ill., a corporation of Illinois No Drawing. Original application June 22, 1934, Serial No. 731,898. Divided and this application February 17, 1937, Serial No. 126,201

4 Claims. (Cl. 260—154)

The present application is a division of our application filed June 22, 1934, Serial No. 731,898, for Alkyl cresols.

Our invention relates to a group of compounds which have bactericidal and bacteriostatic value, and may be classed broadly as alkyl cresols and more particularly as β-methyl-butyl cresols. They are also of value as intermediates for halogenated alkyl cresols which also have bactericidal and bacteriostatic value and which are described and claimed in certain of our co-pending applications.

It is known that the germicidal value of chemical compounds is generally greatly reduced in the presence of blood serum or whole blood. The compounds which we have discovered and which form the subject matter of this application are of high germicidal value in the presence of blood serum and at the same time are of low toxicity, so that our new compounds can be introduced into the human body in relatively high concentrations without any deleterious effect to the patient.

Our new compounds which are specifically described herein, comprise the substantially pure β-methyl-butyl derivatives of ortho, meta, and para cresols. All of these compounds may be made by substantially the same process, which is essentially as follows:

204 grams of zinc chloride are dissolved with heating and mixing in 132 grams of β-methyl-butyl alcohol. The temperature is raised to the appropriate reaction temperature set forth below; in the case of β-methyl-butyl-ortho-cresol this would be 165–170° C. 108 grams of the desired cresol, ortho-cresol in this case, are then added gradually. After the addition is complete the temperature is maintained until the mixture separates into two layers and is then continued for about one hour until a maximum separation occurs. The mixture is then cooled and poured into two liters of water containing a small amount of HCl. The oily layer which separates is then washed with water several times, and is extracted with three portions of ten percent NaOH (about 300 cc. in each portion). The alkaline extract is allowed to stand until there is a clear separation of the insoluble oil. This is removed by extraction with petroleum ether until the alkaline layer no longer becomes cloudy on diluting a small sample with water. The alkaline portion is drawn off and then acidified with HCl. The oil which is liberated is separated, washed with water and then distilled in vacuo. The desired fraction is collected at the boiling points set forth below;

in the case of β-methyl-butyl-ortho-cresol, the desired product would be collected at 134–135° C. at 10 mm. pressure. The product has a specific gravity of 0.973.

The various other products are obtained by the same procedure, substituting the appropriate cresol according to the product desired.

All of the compounds disclosed herein are substantially colorless oils, soluble in organic solvents, completely soluble in dilute alkalis, and insoluble in water.

The physical properties of the compounds which we have prepared are as follows:

| No. | Compound | B. P. | Press. | Sp. gr. | Max. react. temp. |
|---|---|---|---|---|---|
| | | ° C. | Mm. | | |
| (1) | (β-Methyl-butyl)-ortho-cresol | 134–135 | 10 | 0.973 | 165–170° |
| (2) | (β-Methyl-butyl)-meta-cresol | 138–144 | 9 | 0.970 | 165° |
| (3) | (β-Methyl-butyl)-para-cresol | 142–150 | 16 | 0.980 | 165–170° |

The above compounds may have the following graphic formulae:

(1) 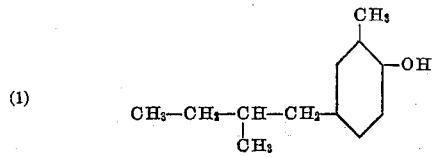

(β-Methyl-butyl)-ortho-cresol (2) 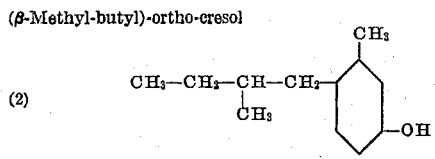

(β-Methyl-butyl)-meta-cresol (3) 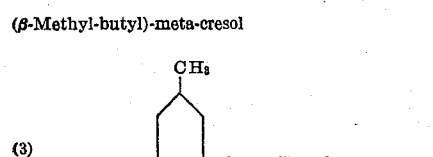

(β-Methyl-butyl)-para-cresol

We claim:
1. A cresol derivative having the formula:

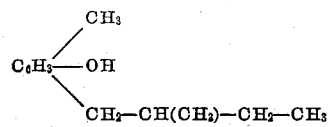

said derivative having high germicidal value combined with low toxicity in the presence of blood serum and being completely soluble in dilute alkali.

2. A germicidal agent having high germicidal value combined with low toxicity in the presence of blood serum consisting of substantially pure β-methyl-butyl-ortho-cresol, said agent having a boiling point of about 134°–135° C. at 10 mm. pressure and being completely soluble in dilute alkali.

3. A germicidal agent having high germicidal value combined with low toxicity in the presence of blood serum consisting of substantially pure β-methyl-butyl-meta-cresol, said agent having a boiling point of about 138°–144° C. at 9 mm. pressure and being completely soluble in dilute alkali.

4. A germicidal agent having high germicidal value combined with low toxicity in the presence of blood serum consisting of substantially pure β-methyl-butyl-para-cresol, said agent having a boiling point of about 142°–150° C. at 16 mm. pressure and being completely soluble in dilute alkali.

GEORGE W. RAIZISS.
LE ROY W. CLEMENCE.